United States Patent
Heerdt

(10) Patent No.: US 9,337,640 B2
(45) Date of Patent: May 10, 2016

(54) ELECTRICAL PROTECTION DEVICE AND METHOD

(71) Applicant: Control Techniques Limited, Newtown (GB)

(72) Inventor: Frank Weiner Heerdt, Montgomery (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 11 days.

(21) Appl. No.: 14/180,803

(22) Filed: Feb. 14, 2014

(65) Prior Publication Data
US 2014/0233136 A1    Aug. 21, 2014

(30) Foreign Application Priority Data
Feb. 15, 2013    (GB) .................................. 1302703.2

(51) Int. Cl.
*H02H 1/00*    (2006.01)
*H02H 9/04*    (2006.01)

(52) U.S. Cl.
CPC ............. *H02H 1/0015* (2013.01); *H02H 9/042* (2013.01)

(58) Field of Classification Search
CPC ............................. H02H 1/0015; H02H 9/042
USPC .......................................................... 361/54
See application file for complete search history.

(56) References Cited

U.S. PATENT DOCUMENTS

| | | | |
|---|---|---|---|
| 5,694,283 A * | 12/1997 | Huczko | 361/93.9 |
| 6,633,467 B2 | 10/2003 | Macbeth et al. | |
| 7,463,460 B2 | 12/2008 | Haines | |
| 8,508,890 B2 | 8/2013 | Zheng et al. | |
| 8,742,828 B2 | 6/2014 | Naumann et al. | |
| 2008/0061794 A1* | 3/2008 | Pankratz | 324/536 |
| 2012/0174961 A1* | 7/2012 | Larson et al. | 136/246 |

FOREIGN PATENT DOCUMENTS

| | | |
|---|---|---|
| DE | 102011107365 | 1/2013 |
| WO | 2012/028247 | 3/2012 |
| WO | WO 2012116722 A1 * | 9/2012 |

* cited by examiner

*Primary Examiner* — Scott Bauer
(74) *Attorney, Agent, or Firm* — Harness, Dickey & Pierce, P.L.C.

(57) ABSTRACT

A voltage measurement is made between two points in a circuit. If the measured voltage exceeds a predetermined amount, a switch is operated to electrically connect the two points.

20 Claims, 15 Drawing Sheets

ELECTRICAL PROTECTION DEVICE AND METHOD

CROSS-REFERENCE TO RELATED APPLICATION

This application claims the benefit and priority of Great Britain Patent Application No. 1302703.2 filed Feb. 15, 2013. The entire disclosure of the above application is incorporated herein by reference.

FIELD

This disclosure relates to electrical protection. In particular, but without limitation, this disclosure relates to electrical protection for electrical distribution systems arranged to distribute electrical power produced by a photo-voltaic source.

BACKGROUND

Electrical energy may be distributed by an electrical distribution system in a number of different manners, exemplary manners including: by overhead electricity lines with exposed conductors, by insulated underground cables, or via solid conductors (bus bars) in an electrical substation. Electrical faults may occur in electrical distribution systems for a number of reasons, exemplary reasons including: a bird spanning the insulators of an overhead power line, water tracking across an insulating component; a breakdown of the insulating properties of an insulator, for example due to age or exposure of the insulator to the elements; and a mechanical digger hitting a buried cable. When an electrical fault occurs, it may result in the formation of an electrical arc whereby the electrical potential difference between two otherwise electrically isolated points is sufficient to cause an electrical breakdown of the air therebetween. An electrical plasma forms which enables current to flow between the two points. Substantial amounts of heat are dissipated by electrical arcs and so they bring with them a significant risk of overheating, or setting on fire, objects in the vicinity thereof. When it is determined that a fault has occurred in an electrical system it is conventional to attempt to isolate components of the system so as to limit or prevent damage caused by the fault.

SUMMARY

Aspects and features of the present disclosure are set out in the appended claims.

In one example, a device is provided for extinguishing electrical arcs in an electrical distribution system. The device is arranged to receive information relating to a voltage that occurs in the electrical distribution system between first and second points thereof. The device is arranged to determine, upon receipt of the information, whether the voltage indicates that an arc is occurring at some point in the electrical distribution system. Upon determination that an arc appears to be occurring within the electrical distribution system, a short circuit is applied between the first and second points so as to extinguish the arc. Advantageously the device and method of operating that device enable the arc to be extinguished thereby removing the fire and heat dangers associated therewith. The device may further be arranged to measure the voltage and send the information about the voltage internally within the device which, as described above, can then receive the sent information. When measuring the voltage, the device may indirectly measure the voltage or may directly measure the voltage itself.

The device may be arranged to short circuit the first and second points via a resonant circuit which may be arranged to have a frequency response such that, when a voltage is initially developed across the resonant circuit, the resonant circuit acts to reduce that voltage. Advantageously such an approach not only extinguishes the arc but allows the electrical distribution system to return to a normal mode of operation once the arc has been extinguished.

The device may determine whether the voltage indicates the presence of an arc by making an assessment of whether or not the voltage exceeds a predetermined threshold voltage. Additionally or alternatively, the device may determine whether the voltage indicates the existence of an electrical arc by performing an analysis of how that voltage varies over time—for example a rapid rate of increase in the voltage may be indicative of the commencement of an arc.

The device may be configured to remove the short circuit after a set time period has elapsed since the short circuit was initiated. Advantageously, such an approach not only extinguishes the arc but also allows the electrical distribution system to return to a normal mode of operation once the arc has been extinguished.

The device may be configured to remove the short circuit once the current flowing between the first and second points exceeds a predetermined amount. This may be achieved by placing a fuse between the first and second points when the short circuiting is initiated. Additionally or alternatively, the current flowing between the first and second points may be monitored and control circuitry may be employed to remove the short circuit once the measured current exceeds a predetermined amount. Advantageously, such an approach not only extinguishes the electrical arc but also allows the electrical distribution system to return to a normal mode of operation once the arc has been extinguished.

The device may comprise a thyristor having its anode and cathode respectively coupled to the first and second points and its gate operable to be triggered so as to initiate a short circuit. Advantageously, as a thyristor will stop passing current once the current passing through it is below a certain amount, by using a triggered thyristor, the device is able not only to extinguish electrical arcs but is also able to return to a normal mode of operation once the arc has been extinguished.

DRAWINGS

Examples of the present disclosure will now be explained with reference to the accompanying drawings in which.

DETAILED DESCRIPTION

Figure 1:
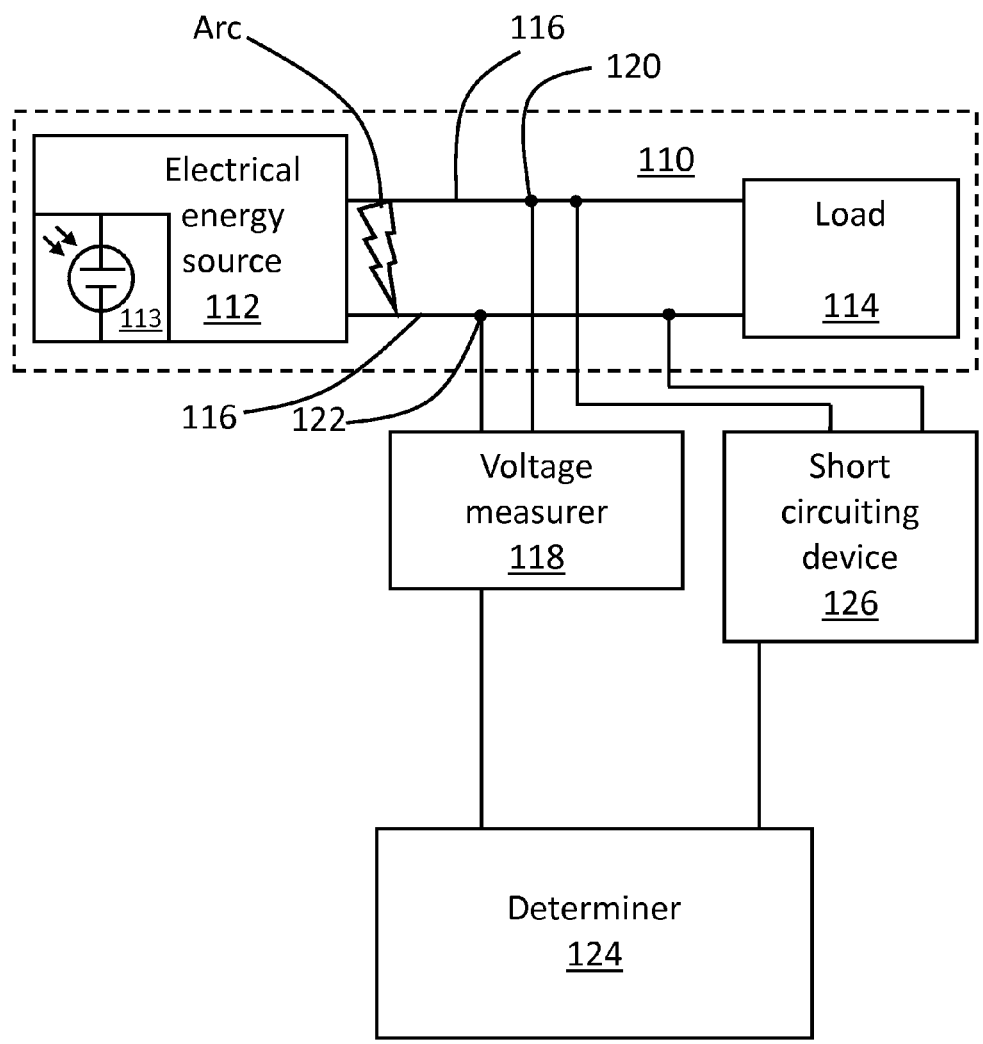
FIG. 1 shows an exemplary system diagram of an electrical distribution system and electrical arc extinguishing device.

FIG. 1 shows an exemplary electrical distribution system 110 which comprises an electrical energy source 112 comprising a photovoltaic assembly 113, the electrical energy source 112 being arranged to supply electrical energy to a load 114 via transmission lines 116. FIG. 1 also shows an electrical arc that is occurring between first and second points 120, 122 of the electrical distribution system.

A voltage measurer 118 is arranged to measure a voltage provided by the electrical energy source 112 between the first and second points 120, 122 of the electrical distribution system. The voltage measurer 118 provides the results of its measurements to a determiner 124 which is arranged to determine whether or not the voltage measurer's 118 measurements are indicative of the presence of an electrical arc within the electrical distribution system 110. The determiner 124 is further coupled to a short circuiting device 126 and is operable, upon determination that the measured voltage is indicative of an electrical arc in the electrical distribution system 110, to cause the short circuiting device 126 to provide a low impedance path, a short circuit, between the first and second points 120, 122 of the electrical distribution system 110.

Although an electrical distribution system may have isolation circuitry associated therewith, isolation circuitry is often arranged to trigger when a current in the isolation circuitry exceeds a predetermined trip threshold. The inventor has arrived at the insight that, in circumstances where the electrical energy source has a high impedance, for example in electrical distribution systems that have solar panel (photovoltaic) sources, the high impedance of the source acts to limit the current drawn when an arc occurs to values that are not always sufficient to trip isolation circuitry. Indeed, even if isolation circuitry is able to trip, disconnection of, for example, the load may result in the voltage produced by the solar panels increasing—thereby fuelling any arc. In such circumstances an arc will not stop until the current flowing through it has been significantly reduced. By using a short circuiting device to short circuit the points between which an arc exists, both the current that the arc can draw, and the voltage across which the arc is maintained, are reduced until they approach zero and thus extinguishing the arc.

Figure 2:
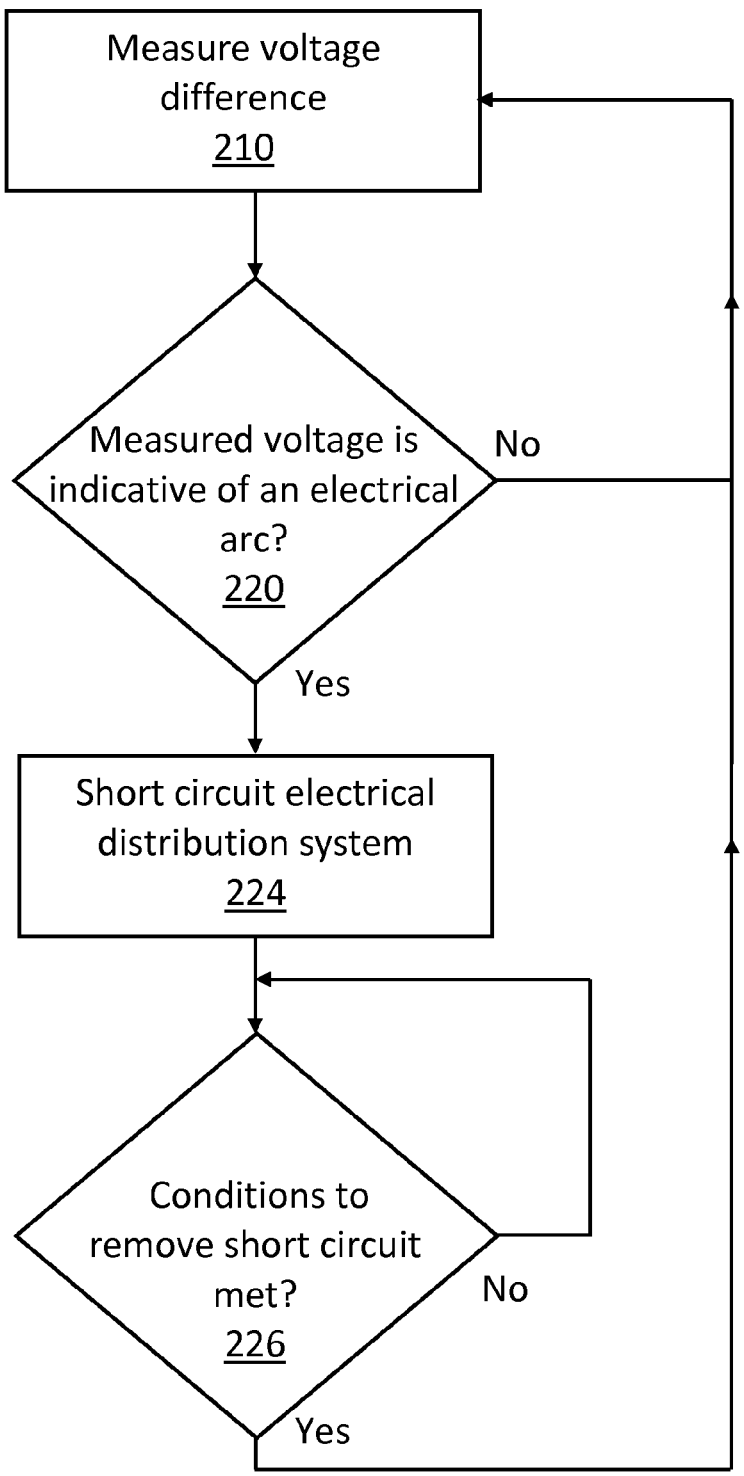
FIG. 2 shows a flow chart illustrating the operation of an exemplary electrical arc extinguishing device.

FIG. 2 shows a flow chart illustrating the operation of an exemplary electrical arc extinguishing device. At step 210 a voltage provided by the electrical distribution system 110 is measured. The measured voltage may be directly or indirectly measured. The measured voltage may be the actual voltage provided by the electrical distribution system 110 between the first and second points 120, 122 thereof, or it may be another voltage indicative of the actual voltage provided by the electrical distribution system 110 between the first and second points 120, 122 thereof. For example, if a potential divider (not shown) is placed in between the first and second points 120,122 of the electrical distribution system 110, the output of that potential divider may be taken as the input for a voltage measurer 118 that is measured at step 210.

At step 220 the determiner 124 makes a determination as to whether or not the measured voltage is indicative of an electrical arc in the electrical distribution system 110. Exemplary manners by which the determiner 124 may determine whether the measured voltage is indicative of an electrical arc include: determining that the measured voltage exceeds a predetermined voltage threshold indicative of an electrical arc, and/or determining that a rate of change of the measured voltage is indicative of the presence of an arc. In the event that the determiner 124 determines that the measured voltage is not indicative of an electrical fault, the method returns to step 210. If the determiner 124 determines that the voltage measured is indicative of an electrical arc, the method proceeds to step 224. As an example, when an arc occurs upstream of the load, the measured voltage will likely be an order of magnitude lower than would be expected during normal operation for the given level of irradiation. Although the measured voltage would likely be significantly lower than the expected voltage, it may not be zero. Furthermore, the voltage across an arc may vary depending on conditions in the circuit. In the event that the measured voltage falls to zero due to an intended turn off of the electrical energy source, activation of the short circuiting device should not cause any harm.

At step 224, the short circuiting device 126 short circuits the first and second points 120,122 of the electrical distribution system 110 by providing a low impedance path there between for the flow of current.

As an optional further step to the method of FIG. 2, at step 226, a determination is made as to whether or not one or more predetermined conditions for removing the short circuit have been met. Exemplary conditions that may be used to determine whether or not to remove the short circuit include: the current flowing thorough the low impedance path in the first and second points 120, 122 of the electrical distribution system 110 exceeding a certain predetermined amount; a predetermined time period having elapsed since initiation of the short circuit; and/or a determination that the measured voltage is no longer indicative of the presence of an electrical arc in the electrical distribution system 110. In the event that the one or more conditions for removing the short circuit are not met then the method loops and repeats step 226, however if the one or more conditions to remove the short circuit have been met then the method returns to step 210. In the event that the arc is successfully removed, the voltage from the electrical energy source 112 will appear as normal at the load 114 and so a recognition of a normal or expected voltage may be used as a condition for stopping the short circuiting.

A person skilled in the art will understand that the criteria for determining whether the voltage is indicative of the presence of an electrical arc in the electrical distribution system may need to be predetermined, for example by design and/or with a knowledge of the circuit 110. In particular, the impedance of the electrical energy source 112 and/or the photovoltaic assembly 113 and the arrangement by which the electrical energy source 112 is connected to the load 114 may be important factors upon which such criteria are based.

As one possibility, a circuit may have one or more electrical energy source modules and one or more load modules positioned in the circuit according to the power levels of each module and the electrical arc extinguishing device may be placed on the load side and therefore designed to operate at a current level that corresponds to the sum of currents produced by any upstream electrical energy source modules.

Figure 3:
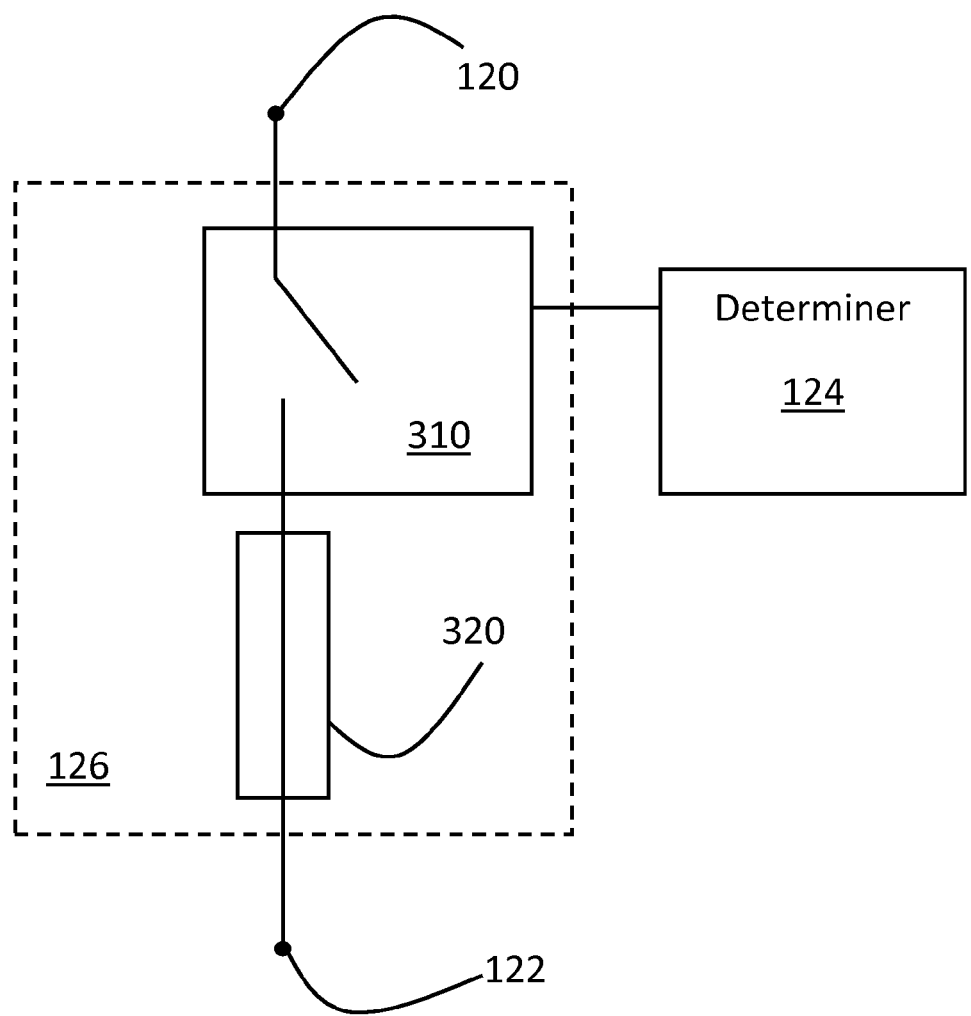
FIG. 3 shows an example of how a short circuiting device may be implemented.

FIG. 3 shows an example of how the short circuiting device 126 may be implemented. In the example of FIG. 3, a contactor 310 is controllable by the determiner 124. The contactor 310 has one side of its switch connected to the first point 120 of the electrical distribution system 110 and the other side of its switch connected to a first side of a fuse 320 the other side of which is connected to the second point 122 of the electrical distribution system 122. Upon determination that the measured voltage is indicative of an electrical arc, the determiner 124 triggers the contactor 310 which thus closes its switch contacts. Consequently the first and second points 120, 122 of the electrical distribution system 110 are short circuited via the fuse 320, current will start to flow between the first and second points 120, 122 and the potential difference between those points will reduce. Once the potential difference between the first and second points 120, 122 reduces below the voltage required for the arc to maintain itself, the arc will be extinguished. As contactors are not designed to open circuits carrying high or very high voltages, normal operation of the electrical distribution system 110 cannot be resumed simply by opening the contact of the contactor 310. Accordingly, the fuse 320 is sized so that, once the current flowing therethrough is in excess of a predetermined amount, the fuse 320 will blow thereby removing the short circuit between the first and second points 120, 122 of the electrical distribution system 110. As one possibility, the fuse may be sized so that it blows after a predetermined time has elapsed since the short circuit was initiated, for example after 10 ms.

Figure 4:
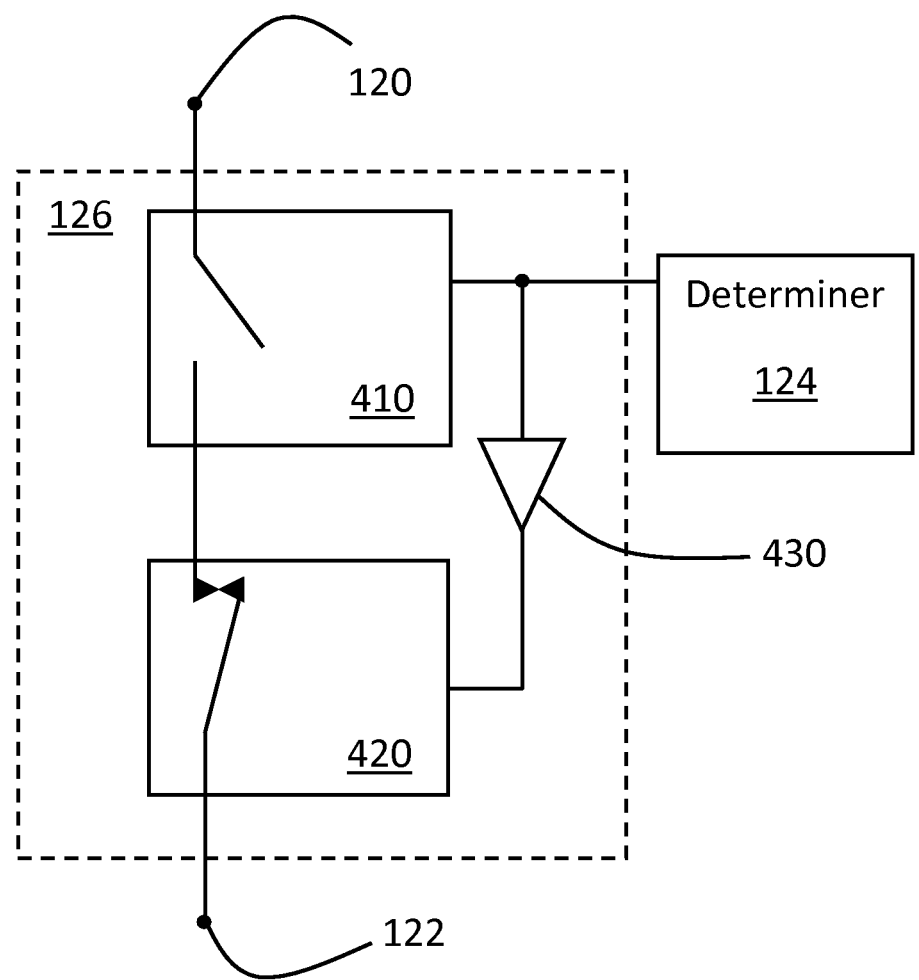
FIG. 4 shows another example of how a short circuiting device may be implemented.

FIG. 4 shows another example of how the short circuiting device 126 may be implemented. In the example of FIG. 4, and as for FIG. 3, the determiner 124 is coupled to a contactor 410 and is operable, upon determination that the measured voltage is indicative of an electrical arc, to trigger the contactor 410 so as to close its switch contacts. In the embodiment of FIG. 4, instead of having a fuse connected between one side of the contactor 410 and the second point 122 of the electrical distribution system 110, a breaker circuit 420 is connected between the contactor 410 and the second point 122 of the electrical distribution system 110. The breaker circuit 420 is arranged to enable, upon initial closure of the switch contacts of the contactor 410, current to flow between the first and second points 120, 122 of the electrical distribution system 110. The breaker circuit 420 is further operable, upon receipt of a control signal, to open its contacts so as to prevent current flowing between the first and second points 120, 122 of the electrical distribution system 110. As one possibility, a delay circuit 430 arranged to introduce a predetermined time delay may have its input connected to the control line that the determiner 124 uses to control the contactor 410 and its output connected to a control input of the breaker circuit 420 so that, after the predetermined time has elapsed following initiation of the short circuit between the first and second points 120, 122 of the electrical distribution system 110, the breaker circuit 420 opens and the short circuit is removed.

Figure 5:
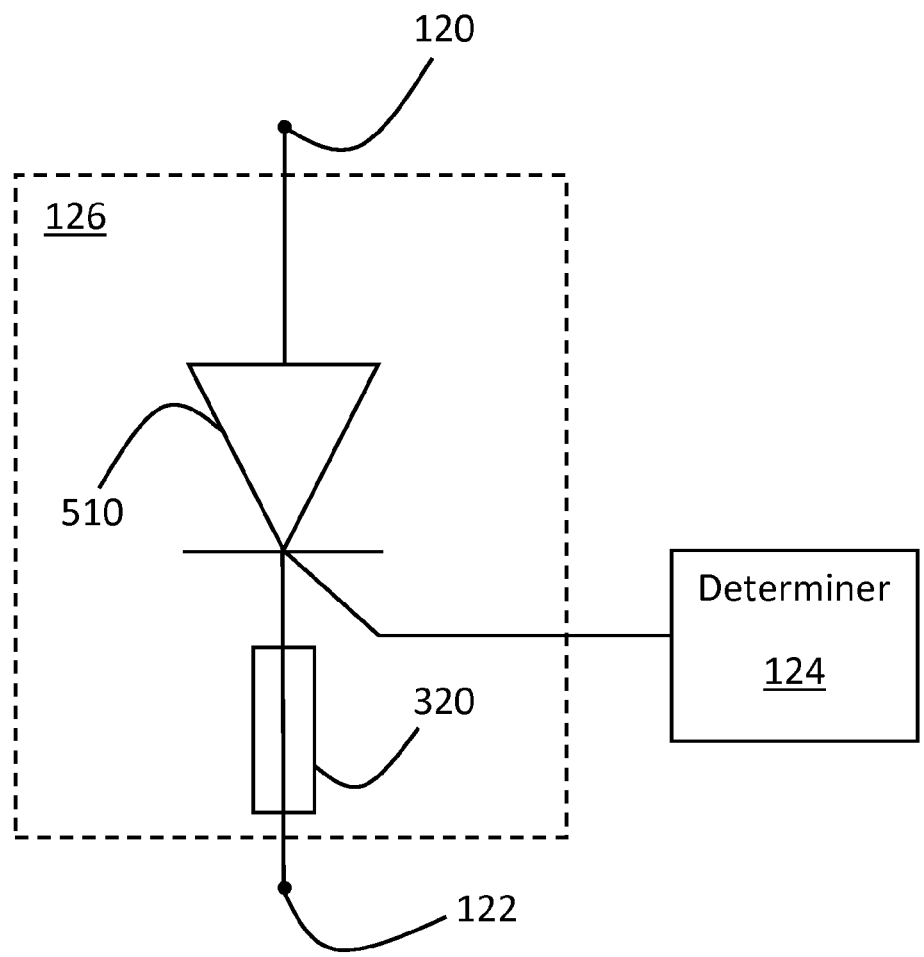
FIG. 5 shows another example of how a short circuiting device may be implemented.
Figure 6:
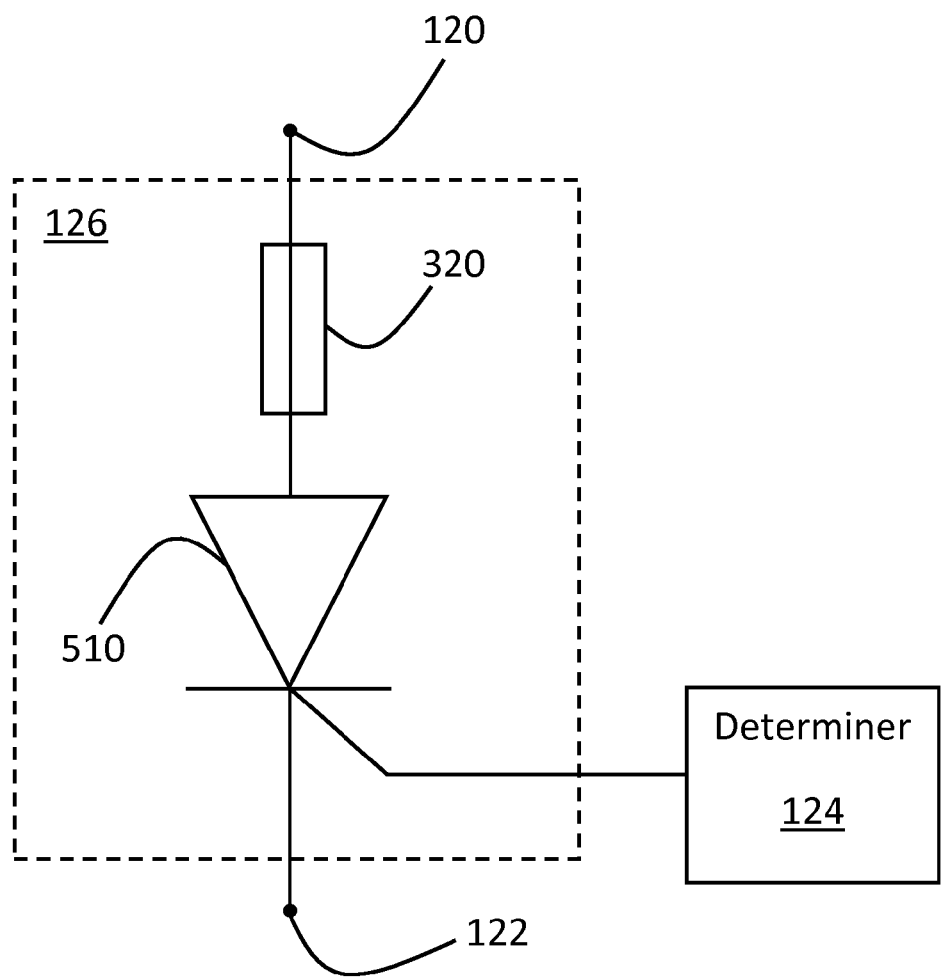
FIG. 6 shows another example of how a short circuiting device may be implemented.

FIG. 5 shows another example of how the short circuiting device 126 may be implemented. In the example of FIG. 5, a thyristor 510 is coupled between the first and second points 120, 122 of the electrical distribution system 110. The anode of the thyristor 510 is coupled to the first point 120 of the electrical distribution system and the cathode of the thyristor 510 is coupled to the second point 122 of the electrical distribution 110. Further, the gate of the thyristor 510 is coupled to the determiner 124 so that, when the determiner 124 determines that the measured voltage is indicative of the presence of an electrical arc in the electrical distribution system 110, the determiner 124 triggers the gate of thyristor 510 so as to allow current to start to flow between the first and second points 120, 122 of the electrical distribution system 110. Once current starts to flow between the first and second points 120, 122 of the electrical distribution system 110 via the thyristor 510, it will continue to do so until the potential difference between the first and second points 120, 122 of the electrical distribution system 110 is reduced to be close to or at zero. Once the potential difference between the first and second points 120, 122 of the electrical distribution system is close to or at zero, the electrical arc will have been extinguished and current will also stop flowing through the thyristor 510. Accordingly, the device of FIG. 5 not only enables electrical arcs to be extinguished, but also resets itself. As another possibility, the fuse 320 and the thyristor 510 may be transposed—for example as shown in FIG. 6.

Figure 7:
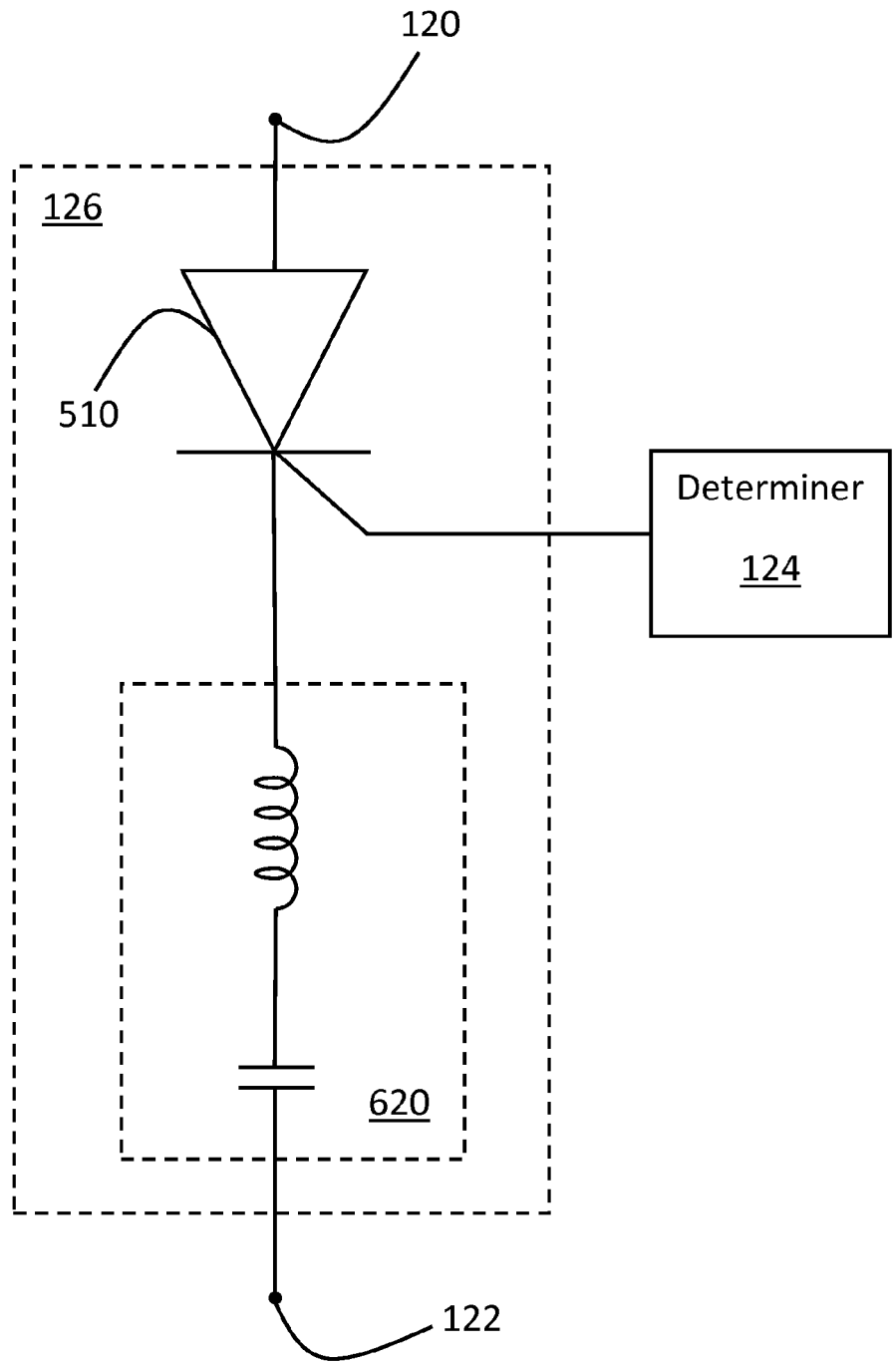
FIG. 7 shows another example of how a short circuiting device may be implemented.
Figure 8:
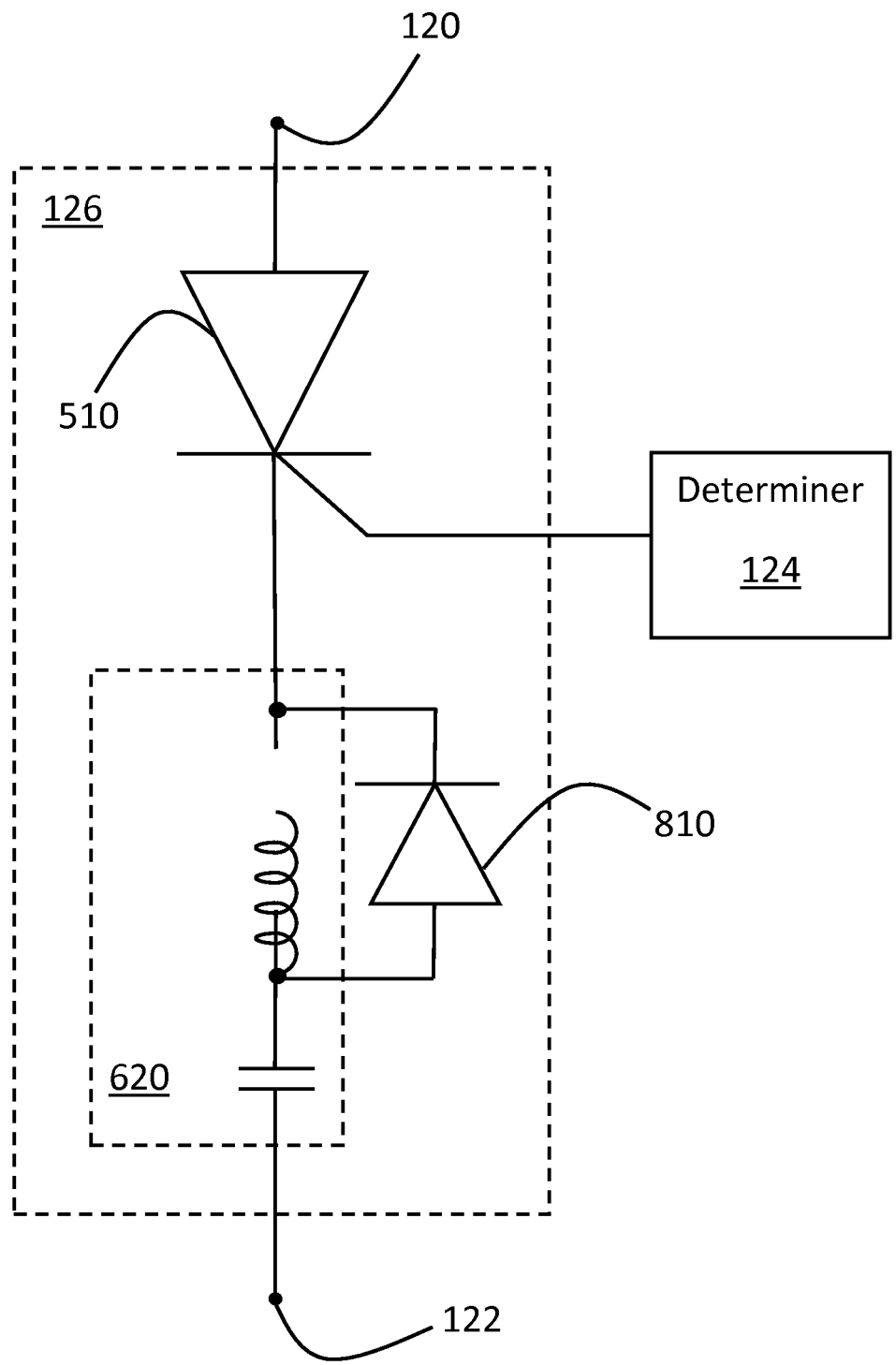
FIG. 8 shows another example of how a short circuiting device may be implemented.

FIG. 7 shows another example of how the short circuiting device 126 may be implemented. In the example of FIG. 7, and as with the examples of FIGS. 6 and 7, a thyristor 510, is connected to the first point 120 of the electrical distribution system 110 and is controllable by the determiner 124 so as to allow current to flow between its anode and cathode when the determiner 124 determines that the measured voltage is indicative of the presence of an electrical arc in the electrical distribution system. In the example device of FIG. 7, the cathode of the thyristor 510 is coupled to the second point 122 of the electrical distribution system 110 via a resonant circuit 620. The resonant circuit 620 is arranged so as to have a complex impedance, for example by having a combination of capacitor, inductors, and/or resistors so that, when a voltage is first applied to the resonant circuit 620, that voltage reduces over time to zero as the components of the resonant circuit 620 charge up If the voltage across the resonant circuit 620 is reduced to zero, then the potential difference between the first and second points 120, 122 of the electrical distribution system, will also approximate zero and so the electrical arc will be extinguished. The short circuiting device 126 of FIG. 7 may further include a measuring/determining device (not shown) for measuring the voltage across the resonant circuit 620, determining that the voltage across the resonant circuit 620 has fallen either to or close to zero, and consequently causing the switch contacts of the contactor 610 to open. As the potential difference between the switch contacts of the contactor 610 would at that point be at or close to zero, the switch contacts could advantageously be opened without damaging the contactor 610. FIG. 8 shows a variation of the short circuiting device 126 of FIG. 7 having an additional diode 810.

Figure 9:
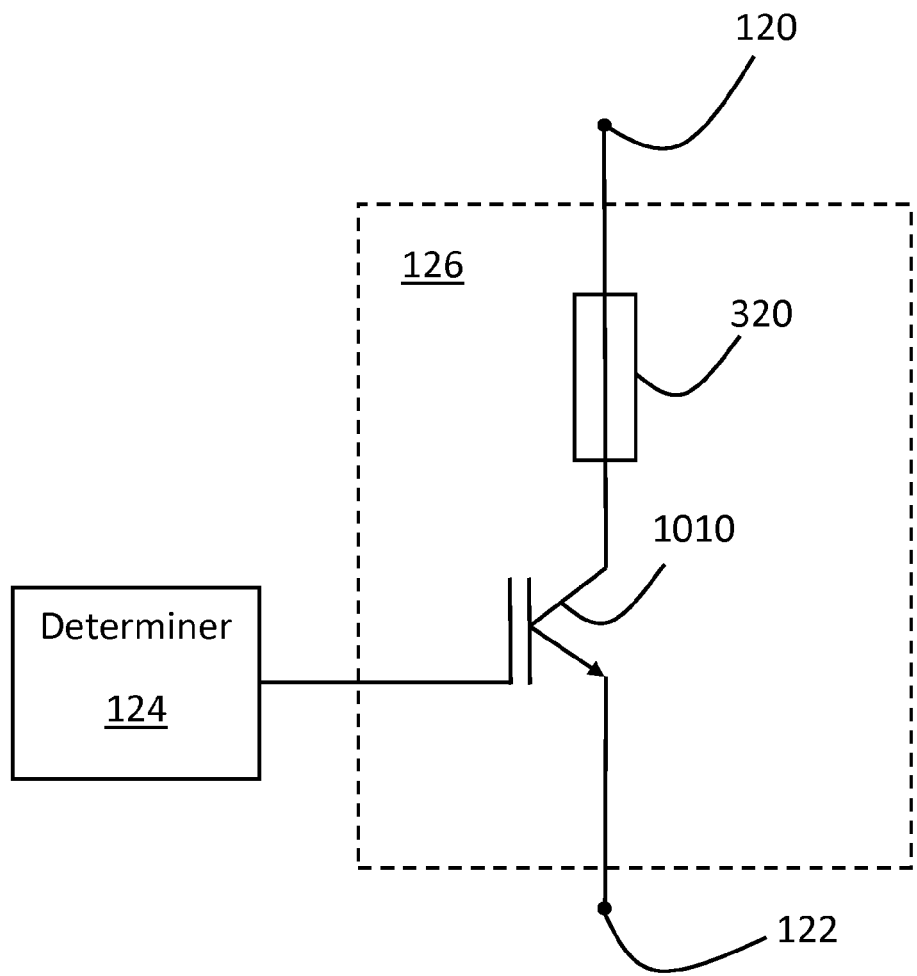
FIG. 9 shows another example of how a short circuiting device may be implemented.

FIG. 9 shows one example of how the short circuiting device 126 may be implemented using a fuse 320 and an insulated-gate bipolar transistor (IGBT) 1010.

Figure 10:
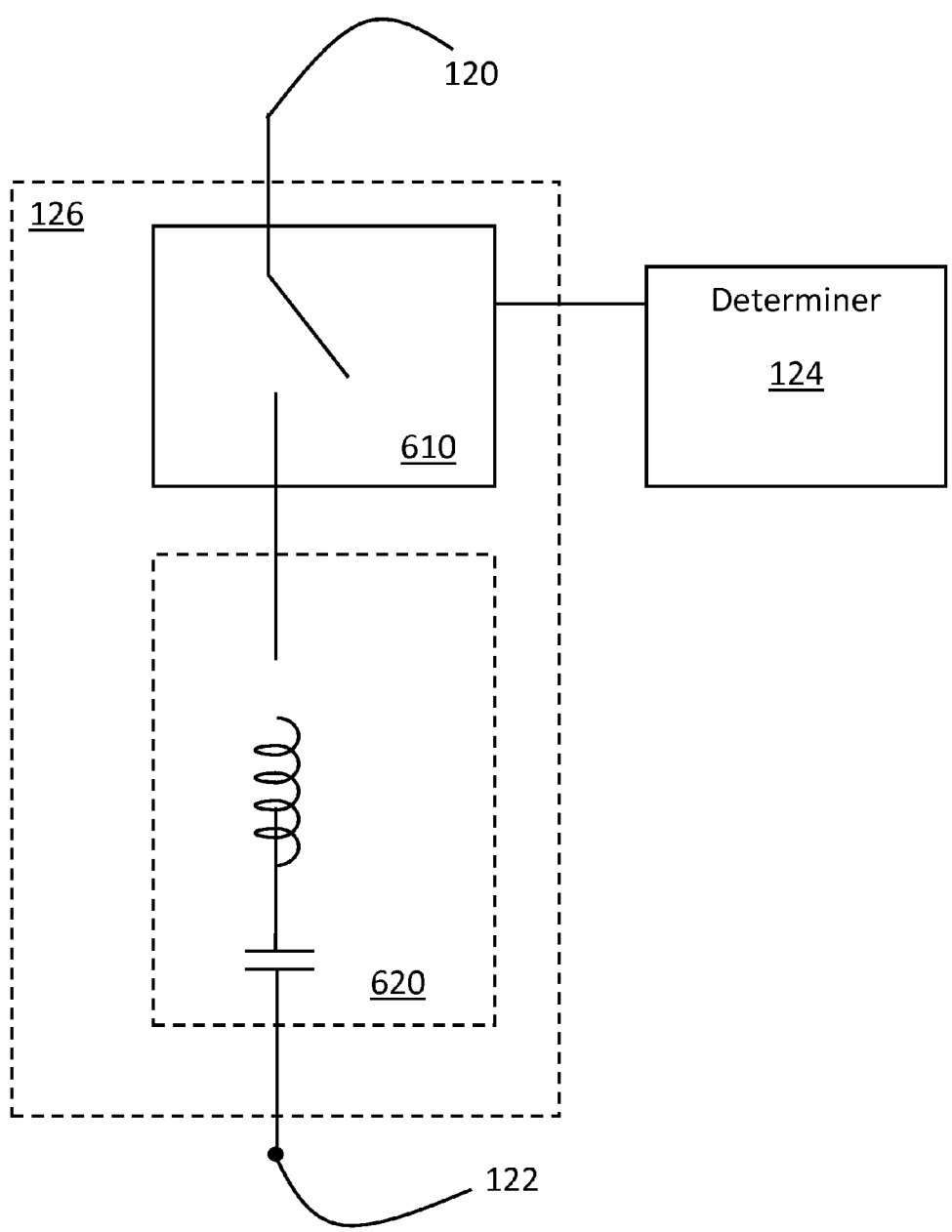
FIG. 10 shows another example of how a short circuiting device may be implemented.
Figure 11:
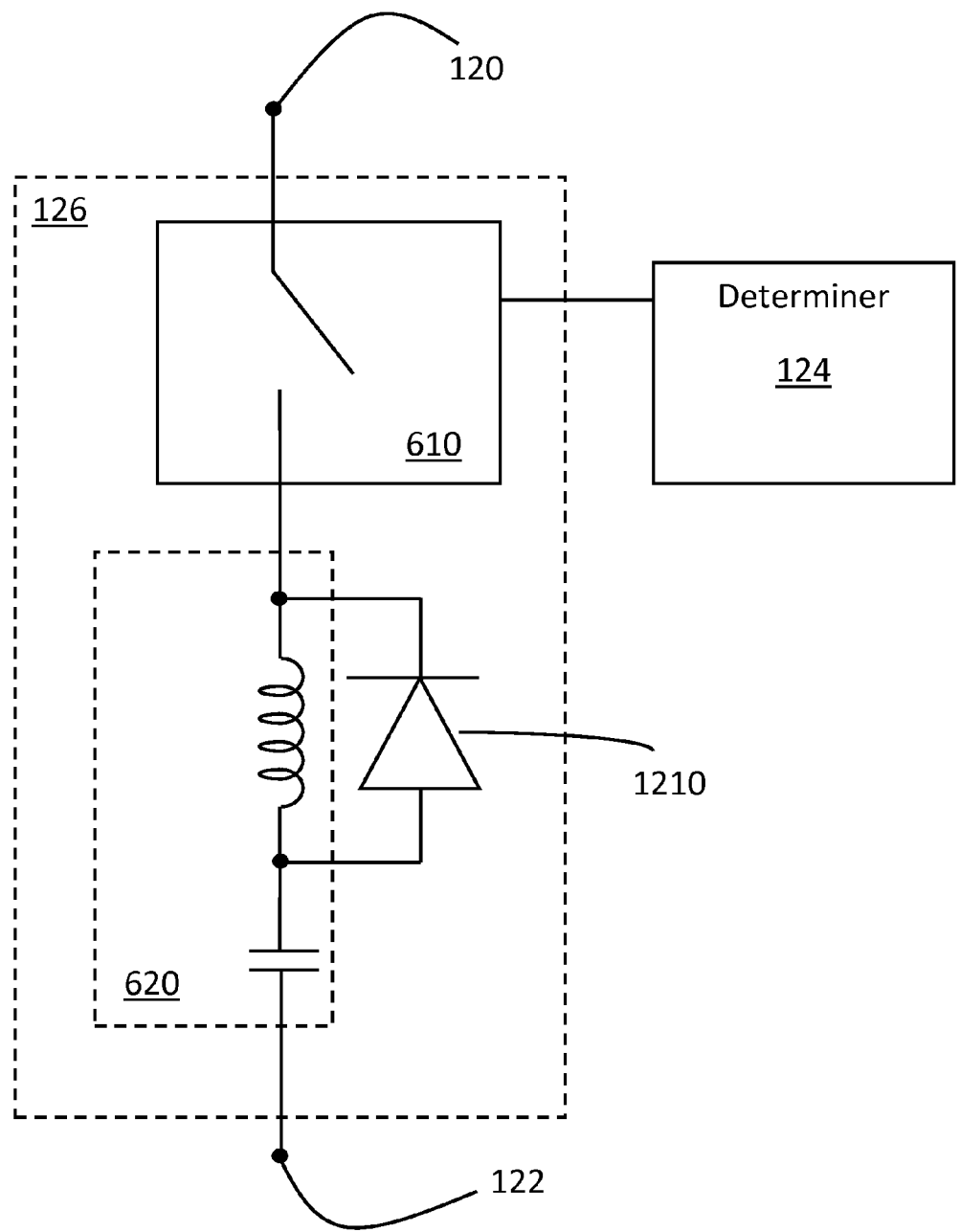
FIG. 11 shows another example of how a short circuiting device may be implemented.
Figure 12:
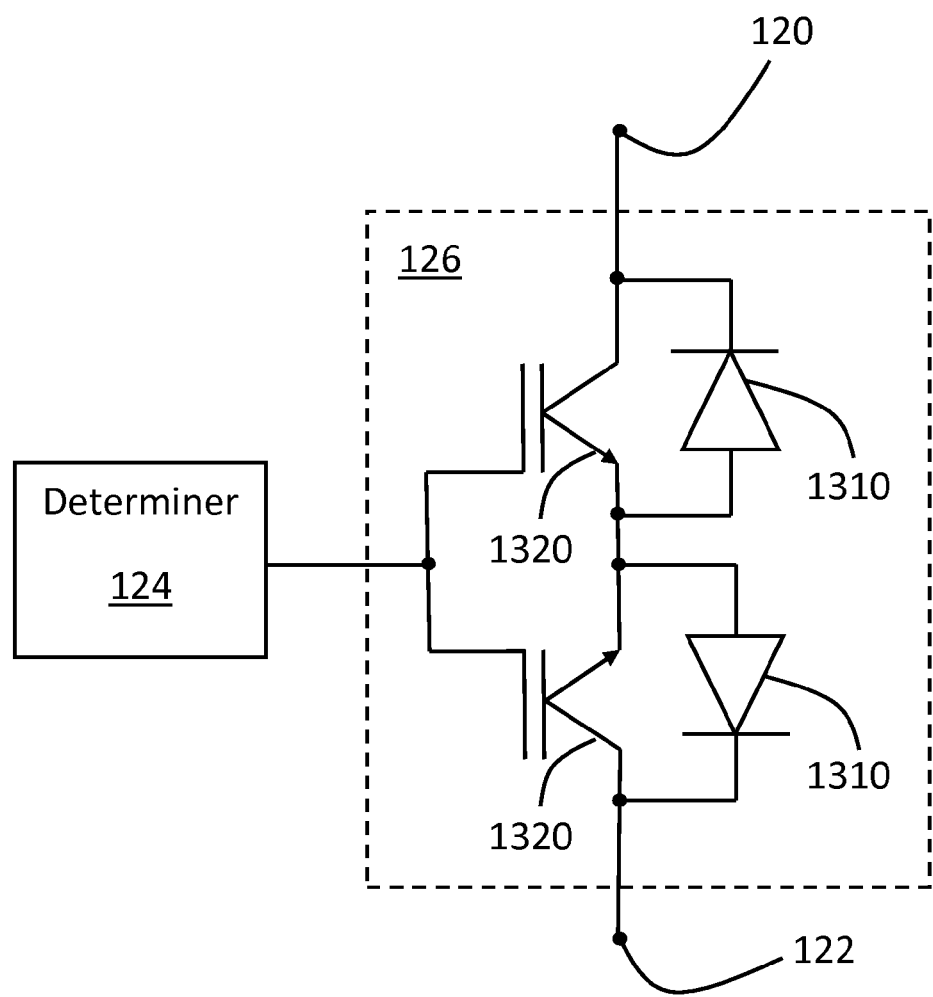
FIG. 12 shows another example of how a short circuiting device may be implemented.
Figure 13:
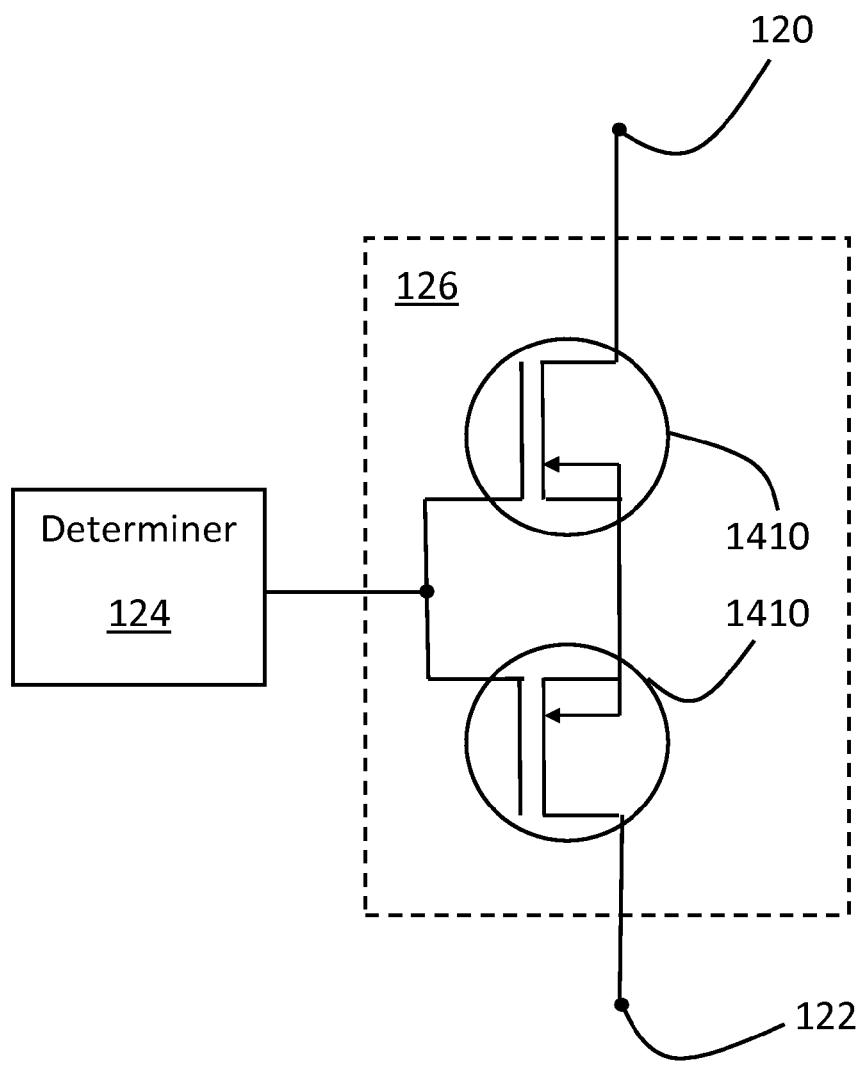
FIG. 13 shows another example of how a short circuiting device may be implemented.
Figure 14:
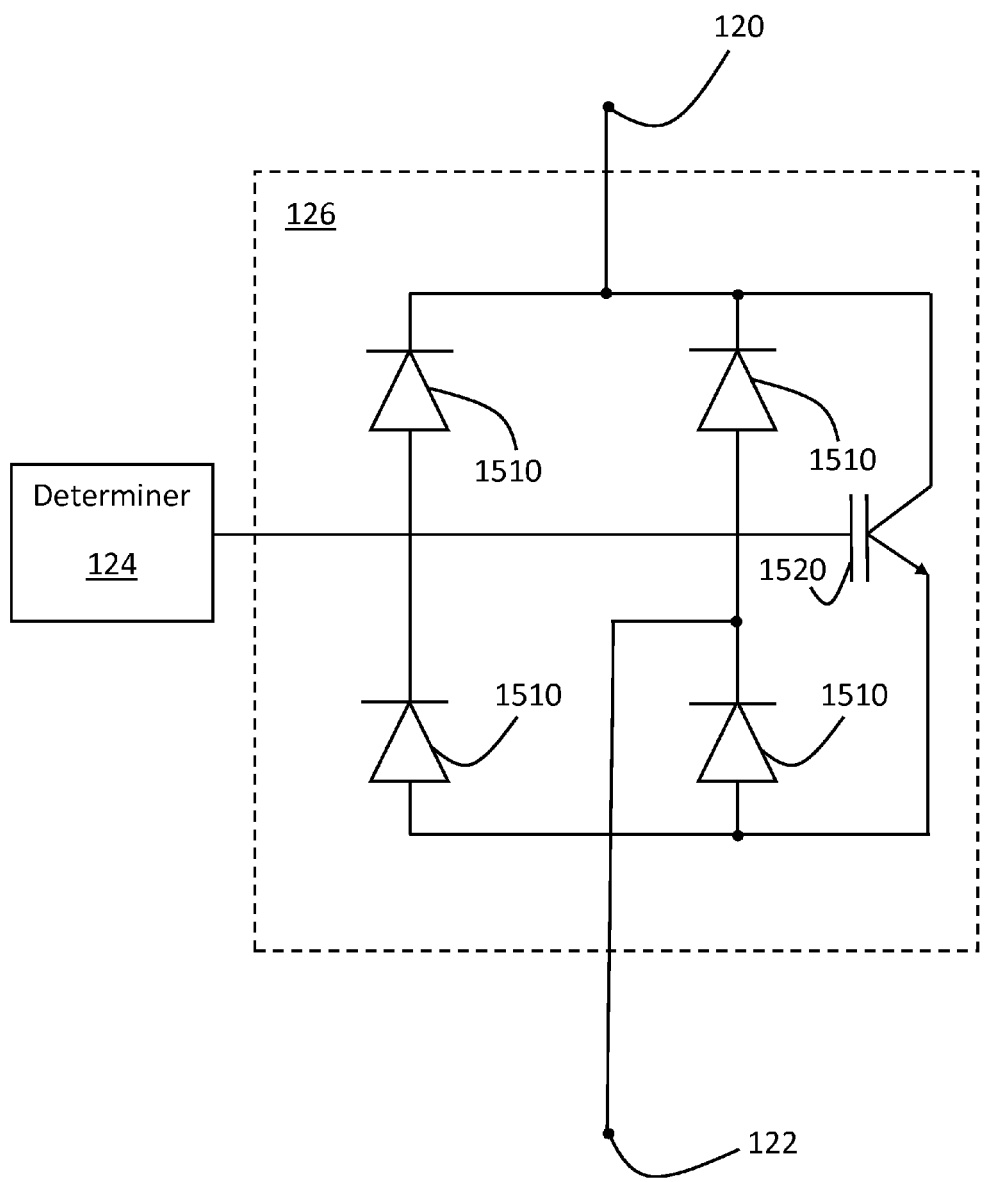
FIG. 14 shows another example of how a short circuiting device may be implemented.

FIG. 10 shows another example of how the short circuiting device 126 may be implemented. In the example of FIG. 10, and as with the examples of FIGS. 3 and 4, a contactor 610 is connected to the first point 120 of the electrical distribution system 110 and is controllable by the determiner 124 so as to close its switch contacts when the determiner 124 determines that the measured voltage is indicative of the presence of an electrical arc in the electrical distribution system. In the example device of FIG. 10, the switch contacts of the contactor 610 are coupled to the second point 122 of the electrical distribution system 110 via a resonant circuit 620. The resonant circuit 620 is arranged so as to have a complex impedance, for example by having a combination of capacitor, inductors, and/or resistors so that, when a voltage is first applied to the resonant circuit 620, that voltage reduces over time to zero as the components of the resonant circuit 620 charge up If the voltage across the resonant circuit 620 is reduced to zero, then the potential difference between the first and second points 120, 122 of the electrical distribution system, will also approximate zero and so the electrical arc will be extinguished. The short circuiting device 126 of FIG. 10 may further include a measuring/determining device (not shown) for measuring the voltage across the resonant circuit 620, determining that the voltage across the resonant circuit 620 has fallen either to or close to zero, and consequently causing the switch contacts of the contactor 610 to open. As the potential difference between the switch contacts of the contactor 610 would at that point be at or close to zero, the switch contacts could advantageously be opened without damaging the contactor 610. FIG. 11 shows how the short circuiting device 126 may be further modified by the addition of a diode 1210.

Figure 15:
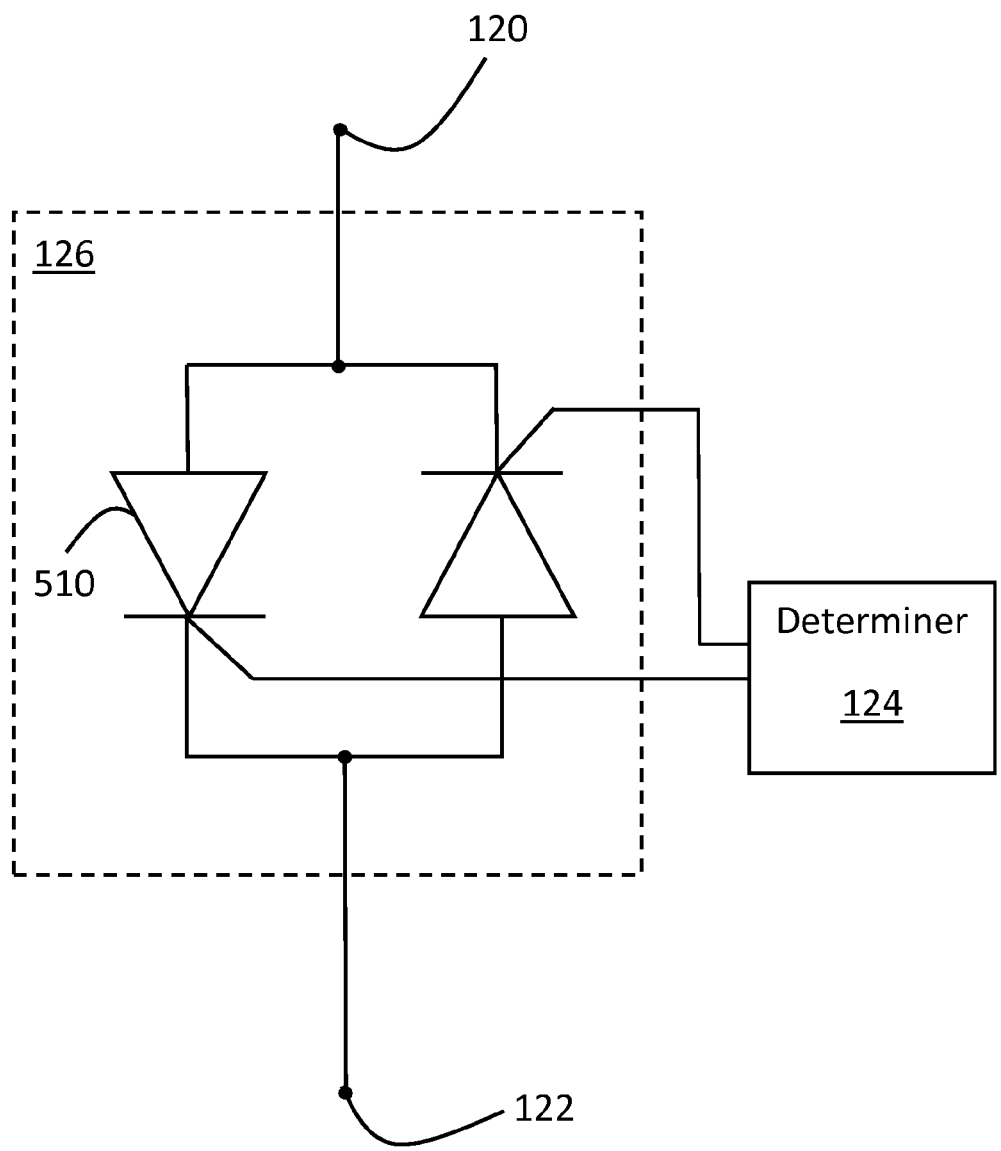
FIG. 15 shows another example of how a short circuiting device may be implemented.

FIGS. 12, 13, 14, and 15, show other examples of how the short circuiting device 126 may be implemented using components including IGBTs 1320, diodes 1310, 1510, insulated gate FETs 1410, and thyristors 510. In the example of FIG. 15, the determiner may control the thyristors independently, or may couple the gates of the thyristors together so that they may be controlled via a single control line.

A person skilled in the art will be well versed in the behaviour of circuit components including capacitors, inductors, diodes, thyristors, IGBTs, IGFETs, and so would be able to comprehend the operation and advantages of circuits comprising such components from circuit diagrams alone.

A person skilled in the art will appreciate that circuits other than those shown the Figures may be employed if they provide the short circuiting device with the required functionality. In particular, resonant circuits such as those shown in the Figures may be employed along with variants of a series LC circuit which may have clamping or freewheeling diodes. Additionally or alternatively, the short circuiting device may comprise a mechanical switch and/or a solid state device comprising: Thyristor(s) (SCR), GTO(s), Mosfet(s), IGBT (s), and/or any other solid state active semiconductor. The short circuiting device may contain one or more fuses designed with a knowledge of the time constant(s) of the circuit so as to be sized to blow after the time needed to extinguish, and cool, the arc has elapsed.

Furthermore, a skilled person will understand that solutions which employ thyristors may also employ another device arranged to make current stop flowing in the thryristor once the arc has been extinguished.

In the above examples that employ a single thyristor, the short circuiting device could be modified so that the thyristor operates as a GTO thyristor capable of turning of the current that flows through it. A person skilled in the art will appreciate that, whilst FIG. 1 shows the first and second points 120, 122 of the electrical distribution system 110 being lying on the distribution lines 116 of the electrical distribution system 110, the first and second points 120, 122 of the electrical distribution system 110 could instead lie at another part of the electrical distribution system 110. For example, the first and second points 120, 122 of the electrical distribution system 110 could lie within part of the electrical energy source 112, for example at or in proximity to the photovoltaic assembly 113. As one possibility, the first and second points 120, 122 of the electrical distribution system 110 could lie within a portion of the load 114.

Although FIG. 1 shows the voltage measurer 118 as being a component that is external to the electrical distribution system, as one possibility the voltage measurer 118 may form part of the electrical distribution system 110, for example a voltage measurer 118 may be made integral to a DC voltage bus of a transmission line 116 of the electrical distribution system 110.

A person skilled in the art will appreciate that the voltage measurer may be configured to send information about the measured voltage to the determiner using a communications protocol, for example a packet switched approach in conjunction with a network, the voltage measurer may also be directly coupled to the determiner as is shown, for example, in FIG. 1.

A person skilled in the art will understand that the terms 'voltage' and 'potential difference' are equivalent terms which may be interchanged throughout the present disclosure without adding to the content of this disclosure.

FIG. 1 shows that the first and second points 120, 122 of the electrical distribution system 110 lie on transmission lines 116 of the electrical distribution system 110 and so the apparatus of FIG. 1 could be used to detect an arc that occurs between two transmission lines 116 of the electrical distribution system 110. As one possibility, one of the first and second points 120, 122 may, instead of being connected to a transmission line 116 of the electrical distribution system 110, be connected to an earth or ground of the electrical distribution system 110 so that an arc between a transmission line 116 and an earth/ground of the electrical distribution system 110 may be extinguished.

A person skilled in the art will understand that, although FIGS. 3 to 15 and the associated description text illustrate example devices that may be used for implementing the short circuiting device 126, as an alternative, any circuit having an ability to perform the required short circuiting could instead be employed. A person skilled in the art will also understand that, although examples of a contactor in combination with a fuse, a contactor in combination with a breaker circuit and a time delay, a thyristor, and a contactor in combination with a resonant circuit, have been used to illustrate how the short circuiting device 126 may be implemented, any combination of those components may also be used to provide the short circuiting device 126.

There is disclosed herein that a voltage measurement is made between two points in a circuit. If the measured voltage exceeds a predetermined amount, a switch is operated to electrically connect the two points.

As one possibility, at least part of the combination of the voltage measurer 118, determiner 124, and short circuiting device 126 may be provided as an integrated hardware solution, or example in the form of an application-specific integrated circuit (ASIC).

The methods described herein may be performed, at least in part, by a computer having a processor and a memory and an input/output device, the computer being operable to load via the input/output device, and from a computer readable medium, computer readable programme instructions for storage in the memory of the computer and which, when executed on the processor of the computer, cause the computer to carry out all or part of any of the methods described herein.

The invention claimed is:

1. An electrical arc extinguishing device for an electrical distribution system, the arc extinguishing device comprising:
   a determiner arranged to:
      receive information about a voltage provided by the electrical distribution system between first and second points in the electrical distribution system;
      determine from the received information whether the voltage provided by the electrical distribution system is indicative of the presence of an electrical arc in the electrical distribution system; and
   a short circuiting device arranged to short circuit the first point to the second point in the event that the determiner determines that the voltage provided by the electrical distribution system is indicative of the presence of an electrical arc and to remove the short circuit once a current flowing between the first and second points exceeds a predetermined amount.

2. The electrical arc extinguishing device of claim 1, the electrical arc extinguishing device further comprising a voltage measurer arranged to:
measure the voltage provided by the electrical distribution system between the first and second points in the electrical distribution system; and
send the information about the voltage provided by the electrical distribution system to the determiner.

3. The electrical arc extinguishing device of claim 1, wherein the short circuiting device comprises a resonant circuit and the short circuiting device is arranged to short circuit the first point to the second point via the resonant circuit.

4. The electrical arc extinguishing device of claim 3, wherein the response characteristics of the resonant circuit are such that, when a voltage is initially developed across the resonant circuit, the resonant circuit acts to reduce that voltage.

5. The electrical arc extinguishing device of claim 1, wherein the determiner is arranged to determine whether the voltage provided by the electrical distribution system is indicative of the presence of an electrical arc in the electrical distribution system by determining that the voltage provided by the electrical distribution system is beyond a predetermined threshold voltage.

6. The electrical arc extinguishing device of claim 1, wherein the determiner is arranged to determine whether the voltage provided by the electrical distribution system is indicative of the presence of an electrical arc in the electrical distribution system by analysing how the voltage provided by the electrical distribution system changes over time.

7. The electrical arc extinguishing device of claim 1, wherein the short circuiting device is arranged to remove the short circuit after a predetermined time period has elapsed since initiation of the short circuit.

8. The electrical arc extinguishing device of claim 1, wherein the short circuiting device comprises a thyristor, the anode and cathode of which are respectively coupled to the first and second points of the electrical distribution system, and further wherein the short circuiting device is operable to trigger the gate of the thyristor so as to initiate the short circuit.

9. The electrical arc extinguishing device of claim 1, wherein the second point is a ground or earth point of the electrical distribution system, and/or wherein the electrical distribution system comprises a photovoltaic assembly.

10. A method of extinguishing electrical arcs in an electrical distribution system, the method comprising the steps of:
receiving information about a voltage provided by the electrical distribution system between first and second points in the electrical distribution system determining from the received information that the voltage provided by the electrical distribution system is indicative of the presence of an electrical arc in the electrical distribution system; and
responsive to the determining, short circuiting the first point to the second point by connecting a resonant circuit between the first and second points.

11. The method of claim 10, the method comprising measuring the voltage provided by the electrical distribution system between the first and second points in the electrical distribution system.

12. The method of claim 10, wherein the response characteristics of the resonant circuit are such that, when a voltage is initially developed across the resonant circuit, the resonant circuit acts to reduce that voltage.

13. The method of claim 10, wherein the determining step comprises determining that the voltage provided by the electrical distribution system is beyond a predetermined threshold voltage.

14. The method of claim 10, wherein the determining step comprises analysing how the voltage provided by the electrical distribution system changes over time.

15. The method of claim 10, further comprising stopping the short circuiting after a predetermined time period has elapsed since the short circuiting was initiated.

16. The method of claim 10, further comprising stopping the short circuiting once a current flowing between the first and second points exceeds a predetermined amount.

17. The method of claim 10, wherein the short circuiting step comprises triggering the gate of a thyristor the anode and cathode of which are respectively coupled to the first and second points of the electrical distribution system.

18. The method of claim 10, wherein the second point is a ground or earth point of the electrical distribution system, and/or wherein the electrical distribution system comprises a photovoltaic assembly.

19. An electrical arc extinguishing device for an electrical distribution system, the arc extinguishing device comprising:
a determiner arranged to:
receive information about a voltage provided by the electrical distribution system between first and second points in the electrical distribution system;
determine from the received information whether the voltage provided by the electrical distribution system is indicative of the presence of an electrical arc in the electrical distribution system; and
a short circuiting device including a resonant circuit, the short circuiting device arranged to short circuit the first point to the second point via the resonant circuit in the event that the determiner determines that the voltage provided by the electrical distribution system is indicative of the presence of an electrical arc.

20. The electrical arc extinguishing device of claim 19, wherein the response characteristics of the resonant circuit are such that, when a voltage is initially developed across the resonant circuit, the resonant circuit acts to reduce that voltage.

* * * * *